(No Model.)
G. H. McKINNEY.
FISH TRAP AND BUCKET.
No. 311,346. Patented Jan. 27, 1885.
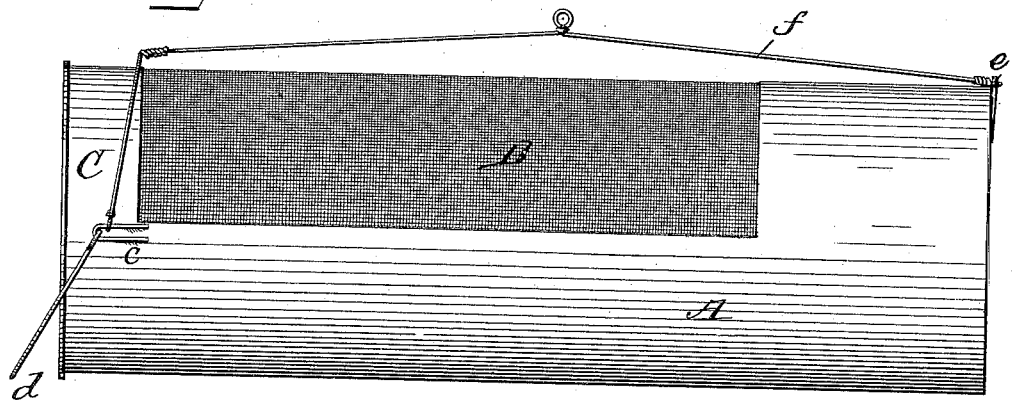
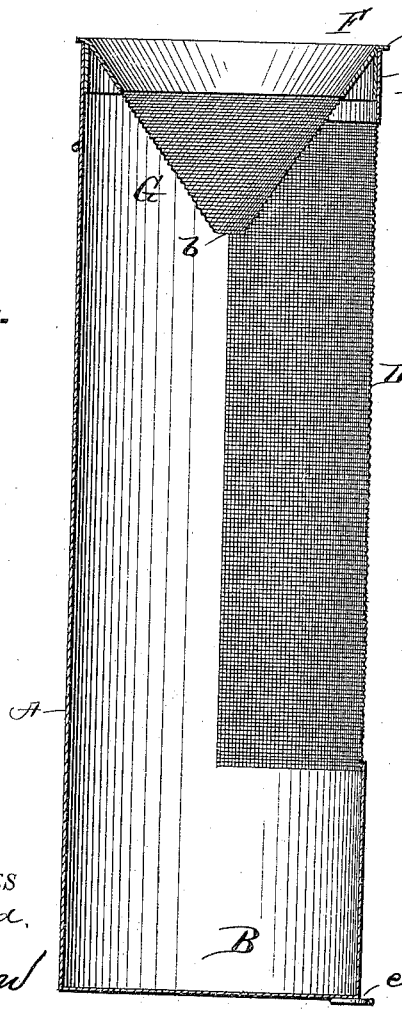
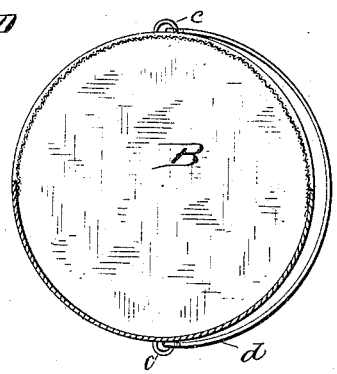
WITNESSES
George H. McKinney
INVENTOR
Attorney

UNITED STATES PATENT OFFICE.

GEORGE H. McKINNEY, OF STANFORD, KENTUCKY.

FISH TRAP AND BUCKET.

SPECIFICATION forming part of Letters Patent No. 311,346, dated January 27, 1885.

Application filed April 7, 1884. (No model.)

*To all whom it may concern:*

Be it known that I, GEORGE H. MCKINNEY, a citizen of the United States, residing at Stanford, in the county of Lincoln and State of Kentucky, have invented certain new and useful Improvements in Fish Traps and Buckets; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention is a combined minnow-trap and bait-holding receptacle; and it consists in the improvements hereinafter described and claimed.

In the accompanying drawings, forming part of this specification, Figure 1 is a side elevation showing my improved trap and receptacle in a horizontal position. Fig. 2 is a central section of my improvement, the same being illustrated in a vertical position; and Fig. 3 is a central transverse section.

A represents a cylindrical section, closed at one end by the head B. The said cylinder A is cut away at one side and at a point some distance from the head B and the other end, C, and the said cut-away portion is covered by a reticulated section or screen, D, secured by any suitable means to the adjacent edges of the cylinder A, forming the cut-away portion thereof. An annular ring, E, is adapted to fit snugly within the open end of the cylinder A, and is provided with a flange, *a*, which bears upon the edge of said cylinder and maintains the said ring E in proper position thereon. A second annular ring, F, is connected to the upper edge of the said ring E, and is inclined toward the center of the receptacle, as seen in Fig. 2. A cone composed of a screen-section, G, is connected at its upper edge to inclined ring F, and is perforated at its apex to present an opening, *b*, by which communication is established through the said cone to the interior of the cylinder A. Loops *c* are secured on the side of the cylinder for the attachment of a bail or handle, *d*. Another loop, *e*, is located on the edge of the head B.

To use the device as a minnow-trap the annular ring E and its screen-cone G will be removed from the open end of the cylinder A, a suitable bait placed in said cylinder, and the said ring and cone replaced. The device can then be suspended in a horizontal position in the water by placing a suspending-cord, *f*, through the loops *c* and *e*, as shown in Fig. 1. The minnows, attracted by the bait through the reticulated section D, will ultimately find their way through the opening *b* of the cone-section G to the interior of the cylinder A, and are prevented from passing out of said cylinder by the peculiar shape of the said section G.

When the device is to serve as a bait bucket or receptacle, it will be carried in a vertical position by means of the bail *d*, the water in the cylinder A beneath the screen-section D being sufficient to keep the bait alive.

I claim—

1. In a combined fish trap and bucket, the body A, forming a single compartment or receptacle, and provided with a reticulated section, D, attached to the body portion, as shown, in combination with a removable conical section provided with an end ring adapted to be inserted in the open end of the body portion, substantially as set forth.

2. In a combined fish trap and bucket, the combination, with the body A, provided with a reticulated section, D, of ring E and inclined ring F, carrying a perforated cone, G, substantially as and for the purpose set forth.

3. The combination, in a combined fish trap and bucket, of the body provided with the reticulated section D, arranged as described, a ring, E, having an inclined ring, F, carrying a perforated cone, G, loops *c*, having the bail *d* attached, and loop *e*, located at or near the bottom of the device, as and for the purpose set forth.

In testimony whereof I affix my signature in presence of two witnesses.

GEORGE H. McKINNEY.

Witnesses:
 W. B. McROBERTS,
 THOS. RICHARDS.